Jan. 13, 1959  G. ZIMMERMAN  2,867,948
ELECTRIC WELDING GLASS PARTS
Filed Jan. 12, 1954

INVENTOR.
GEORGE ZIMMERMAN
BY Rule and Hoge.

United States Patent Office 2,867,948
Patented Jan. 13, 1959

2,867,948

ELECTRIC WELDING GLASS PARTS

George Zimmerman, Toledo, Ohio, assignor to Owens-Illinois Glass Company, a corporation of Ohio Application January 12, 1954, Serial No. 403,541

5 Claims. (Cl. 49—82)

My invention relates to a method of electric welding. The invention comprises a method in which the surface portions of glass parts which are to be welded together are initially heated at the welding area to soften the glass, permitting the parts to be united and also permitting a pair of spaced electrodes to be projected into the softened glass. An electric current is then transmitted through the body of glass between the electrodes while the latter are immersed in the softened glass, thereby raising the temperature of the glass. Relative movement between the electrodes and the united glass parts provides a plowing action or movement of the electrodes through the glass by which the latter is stirred while in a fluid condition. At the same time the glass at the welding area may be stretched and worked by moving the glass parts to and from each other.

In present day methods of electrically welding glass parts, wherein the electrodes are maintained at or close to the surface of the glass and wherein an arc is usually drawn, the intense heat applied to the exposed surface at the weld produces chemical and physical reactions which are not conducive to a perfect weld. The glass is raised to a high temperature at which it boils, forming bubbles or seeds within the glass and resulting in an imperfect weld. The exposed surface of the glass is also subjected to the chemical reaction, either oxidizing or reducing, induced by the atmospheric air and the gases of combustion employed for maintaining the high temperature, the result of which is an imperfect weld.

An object of the invention is to overcome these objections and provide a method of producing a superior weld, particularly by applying an intense localized heat at the welding area but beneath the surface of the glass, and at the same time working the glass in a manner to produce homogeneity and a perfect weld.

Referring to the accompanying drawings.

Figure 1:
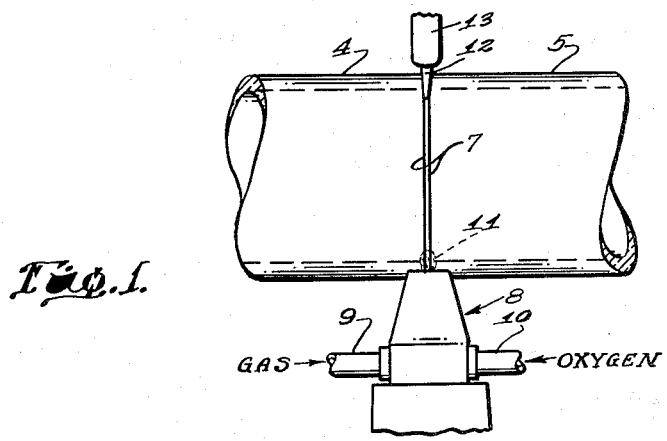
Fig. 1 is an elevational view of glass tubes and means for welding them together.
Figure 2:
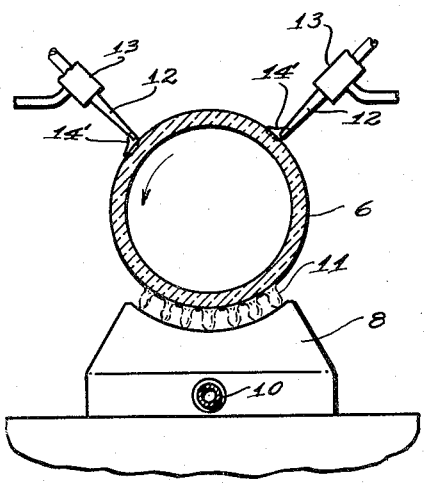
Fig. 2 is a cross-sectional view of the same with the electrodes in welding position.

As shown on the drawing two pieces or sections 4 and 5 of glass tubing are being welded together to form a single tube 6. The ends 7 which are to be welded together are brought into close proximity, with the end surfaces spaced, for example, an eighth of an inch apart. The sections 4 and 5 are then rotated as a unit about their axis, and at the same time heated by a burner 8 positioned beneath the tube. The latter may be mounted for rotation in a horizontal lathe. Fuel gas and oxygen are applied to the burner through pipes 9 and 10. A series of jets of flame 11 from the burners are distributed in an arc along the surface of the glass and serve to heat the glass to a temperature at which it is sufficiently soft to permit the electrodes to be projected into or immersed in the softened glass. Such temperature may be about 1600° F., more or less, depending on the composition of the glass.

Figure 3:
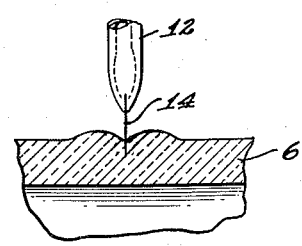
Fig. 3 is a fragmentary view showing an electrode immersed or partially embedded in the glass during the welding operation.

The electrodes 14, preferably in the form of platinum wires, are water cooled, and for this purpose are mounted in water cooled holders 12 extending from barrels 13 through which water or other cooling fluid is circulated. The free ends or tips of the electrodes are projected beneath the surface of the glass (Fig. 3). The rotation of the tube causes the electrodes to plow through the glass stirring the glass beneath the surface and thereby obtaining a homogeneous condition of the glass. The speed of rotation may be sufficient to cause a wave or surge 14' of the molten glass to follow in the wake of the electrodes.

The electric current passing through the glass between the electrodes raises the temperature sufficiently to produce a highly molten condition of the glass beneath the surface. During this welding operation the two sections of glass 4 and 5 may be reciprocated toward and from each other in a manner to stretch and work the glass for insuring an effective splice or weld. The electrodes are then withdrawn. Preferably, the current is cut off before these electrodes are withdrawn from the surface of the glass. The welded portion may then be fire-polished by the use, for example, of any oxyhydrogen gas burner, thus completing the welding operation.

Modifications may be resorted to within the spirit and scope of my invention.

I claim:

1. The method of welding two glass parts together which comprises heating surface portions of said parts and thereby softening the glass, bringing said softened surfaces together, embedding spaced electrodes in the softened glass, transmitting electrical energy between the electrodes through the softened glass sufficient to raise the temperature and melt a sub-surface portion of the glass at the welding area, causing a relative movement of the glass and the electrodes, while the latter are embedded within the glass, in a path extending along the united surfaces, thereby causing the electrodes to plow through and stir the molten glass.

2. The method of welding together two glass parts which comprises heating the surface portions which are to be welded together, to a temperature at which the glass is softened, bringing the softened surfaces together, projecting spaced electrodes into the glass at the welding area, rotating said parts about a common axis and as a unit while the electrodes are embedded in the glass, passing an electric current between the electrodes and through the softened glass concurrently with the said rotation, thereby further heating and melting the glass and plowing the electrodes through the molten glass.

3. The method defined in claim 2, the said heating and softening of the glass being effected by burners positioned adjacent to the rotating glass.

4. The method of welding together glass articles which comprises bringing the surfaces which are to be welded into close proximity, rotating said articles as a unit about an axis while said surfaces are narrowly spaced, applying a heating flame to the said spaced surfaces and thereby heating the surface portions sufficiently to soften them, bringing said softened surface portions together with the surfaces in a plane perpendicular to said axis, projecting spaced electrodes into the softened glass at said plane with the tips of the electrodes embedded in the softened glass, transmitting electrical energy between the electrodes and through the softened glass while said parts are rotating thereby bringing the glass at the welding surfaces to a fluid condition and concurrently plowing the electrodes through the molten glass.

5. The method defined in claim 4, said method including working the glass at the welding area by a reciprocating movement of the glass parts in a direction parallel to said axis.

References Cited in the file of this patent

UNITED STATES PATENTS

| | | |
|---|---|---|
| 2,268,670 | Ronci | Jan. 6, 1942 |
| 2,389,360 | Guyer et al. | Nov. 20, 1945 |
| 2,445,063 | Guyer | July 13, 1948 |
| 2,527,720 | Guyer | Oct. 13, 1950 |
| 2,590,173 | Guyer | Mar. 25, 1952 |
| 2,680,332 | Young | June 8, 1954 |